US 7,519,949 B2

(12) United States Patent
Massaro et al.

(10) Patent No.: US 7,519,949 B2
(45) Date of Patent: Apr. 14, 2009

(54) MARKING CHANGES BASED ON A REGION AND A THRESHOLD

(75) Inventors: Timothy John Massaro, Mazeppa, MN (US); Guy Wesley Vig, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1024 days.

(21) Appl. No.: 10/438,390

(22) Filed: May 15, 2003

(65) Prior Publication Data
US 2004/0230952 A1 Nov. 18, 2004

(51) Int. Cl.
*G06F 9/45* (2006.01)
(52) U.S. Cl. ..................................... 717/120
(58) Field of Classification Search ................. 717/120, 717/122–123; 715/511, 513
See application file for complete search history.

(56) References Cited
U.S. PATENT DOCUMENTS

| | | | | |
|---|---|---|---|---|
| 6,219,818 B1 * | 4/2001 | Freivald et al. | ............. | 714/799 |
| 6,249,795 B1 * | 6/2001 | Douglis | ....................... | 715/511 |
| 6,366,933 B1 * | 4/2002 | Ball et al. | .................... | 715/511 |
| 6,560,620 B1 * | 5/2003 | Ching | ......................... | 715/511 |
| 6,834,306 B1 * | 12/2004 | Tsimelzon | .................. | 709/228 |

OTHER PUBLICATIONS

Liu et al., "WebCQ—Detecting and Delivering Information Changes on the Web", CIKM '00, ACM 2000, pp. 1-8.*
Douglis et al., "The AT&T Internet Difference Engine: Tracking and Viewing Changes on the Web", AT&T Labs—Research Technical Report #97.23.1, Apr. 14, 1997, pp. 1-24.*

* cited by examiner

*Primary Examiner*—John Chavis
(74) *Attorney, Agent, or Firm*—Owen J. Gamon

(57) ABSTRACT

A method, apparatus, system, and signal-bearing medium that in an embodiment compare versions and mark an entire region as changed when the number of changes to the region exceeds a threshold. In contrast, when the number of changes in a region does not exceed the threshold, the individual changes are marked. In this way, a user can distinguish between versions both when the number of changes to a region is few and when the number of changes is large.

16 Claims, 9 Drawing Sheets

US 7,519,949 B2

MARKING CHANGES BASED ON A REGION AND A THRESHOLD

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to computers and more particularly to marking changes in versions of files based on a region and a threshold.

BACKGROUND

The development of the EDVAC computer system of 1948 is often cited as the beginning of the computer era. Since that time, computer systems have evolved into extremely sophisticated devices capable of storing and retrieving vast quantities of data. This data is often stored on a computer in units called files, and computers often have a large number of files. Users commonly save multiple versions of the same file, each version having slightly or drastically different data from the other. For example, different versions of a file called "Product Documentation" might contain documentation describing different releases of a product. With so many files and so many versions of files, users can quickly become confused as to which version of which file contains which data. To assist users in differentiating versions of files, tools are available that compare two versions of a file, and generate a result that illustrates how the versions are different.

These compare tools work well when the changes from one version to the next are simple word revisions, spelling error corrections, or changes from one word to a more appropriate word. Unfortunately, some versions of files are so drastically different from a previous version that the compare tools can generate a result that is very difficult for the reader to understand.

For example, some compare tools show each word or phrase that has been deleted, usually in strike-through font, immediately followed by the word or phrase that replaces it, often in a special color. This works well for small changes such as spelling corrections, but reviewers may have difficulty reading this format when changes are sprinkled throughout a paragraph, especially when the meaning of the paragraph has changed.

In an attempt to address this problem, some compare tools work on a line-by-line basis, showing, often side-by-side, the old lines next to the new lines, lining up and highlighting the regions that have changed. This works well for files that have major changes, but is problematic in that the reviewer may easily miss which words, characters, or punctuation have actually changed in each line.

Without a compare tool that works well for a variety of revision types, users will continue to be frustrated in their attempt to distinguish between multiple versions. Although the aforementioned problems have been described in the context of multiple versions of text files, they can also apply to other types of data.

SUMMARY

A method, apparatus, system, and signal-bearing medium are provided that in an embodiment compare versions and mark an entire region as changed when the number of changes to the region exceeds a threshold. In contrast, when the number of changes in a region does not exceed the threshold, the individual changes are marked. In this way, a user can distinguish between versions both when the number of changes to a region is few and when the number of changes is large.

DETAILED DESCRIPTION

Figure 1:
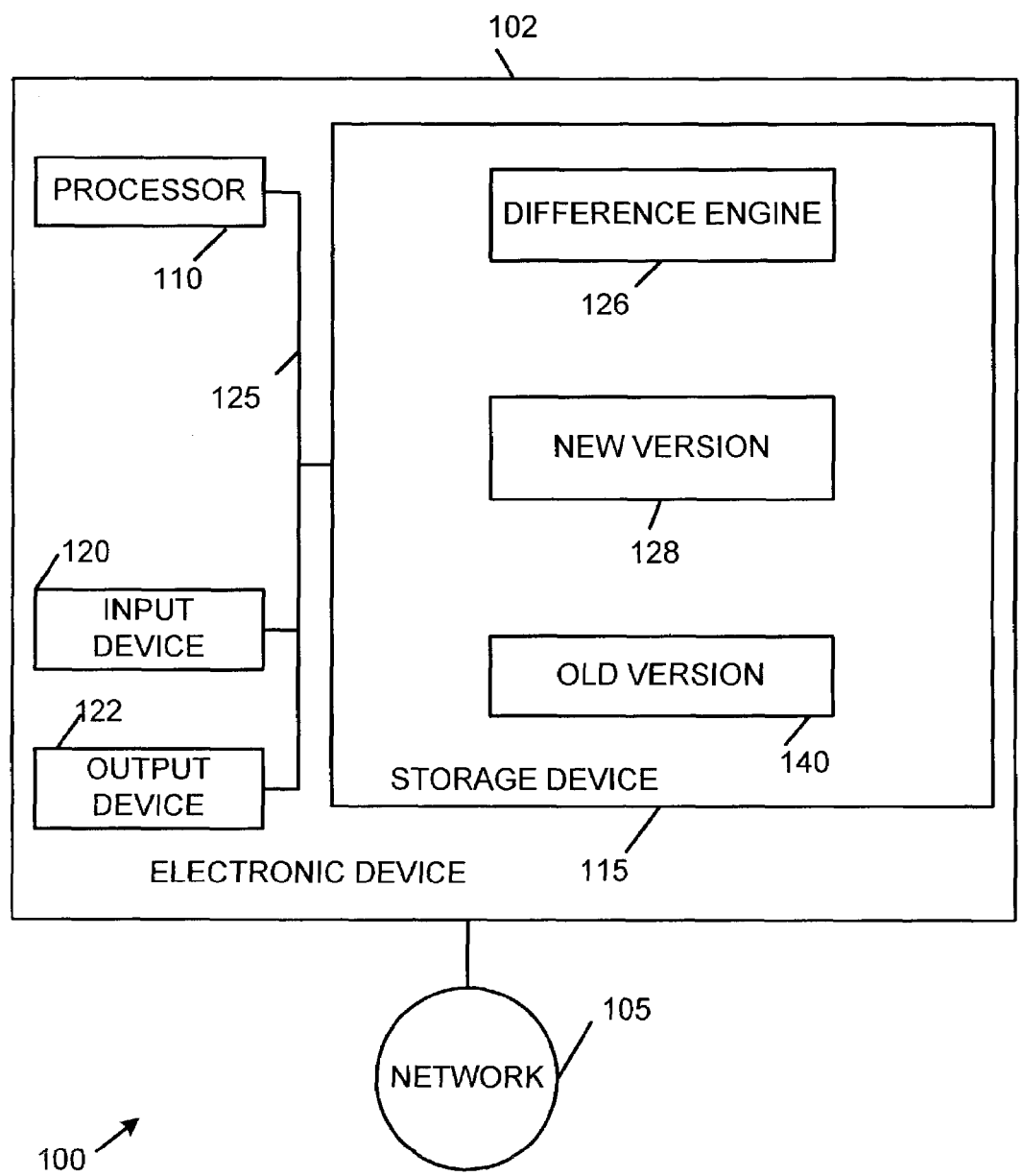
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 105.

The storage device 115 includes a difference engine 126, a new version 128, and an old version 140. In an embodiment, the difference engine 126 includes instructions capable of executing on the processor 110 or statements capable of being interpreted by instructions executing on the processor 110 to display the user interfaces as further described below with reference to FIGS. 2, 3, 4, 5, 6, and 7, and to carry out the functions as further described below with reference to FIGS. 8 and 9. In another embodiment, the difference engine 126 may be implemented in hardware via logic gates and/or other appropriate hardware techniques.

The new version 128 and the old version 140 are objects that the difference engine 126 is to compare. In various embodiments, the new version 128 and the old version 140 may be any type of file, database, object, or other data repository and may contain any appropriate type of data such as source code, image data, word processing data, or audio data (e.g. the input from two different microphones). In another embodiment, the new version 128 and the old version 140 may be written in any of a variety of markup languages, such as HTML (HyperText Markup Language), XML (Extensible Markup Language), SGML (Standard Generalized Markup Language), or any other appropriate markup language. Although the new version 128 and the old version 140 are illustrated as being contained within the storage device 115 in the electronic device 102, in other embodiments they may be on different electronic devices, or one or both of the new version 128 and the old version 140 may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of FIGS. 2, 3, 4, 5, 6, and 7, as further described below.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of FIGS. 2, 3, 4, 5, 6, and 7, as further described below.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
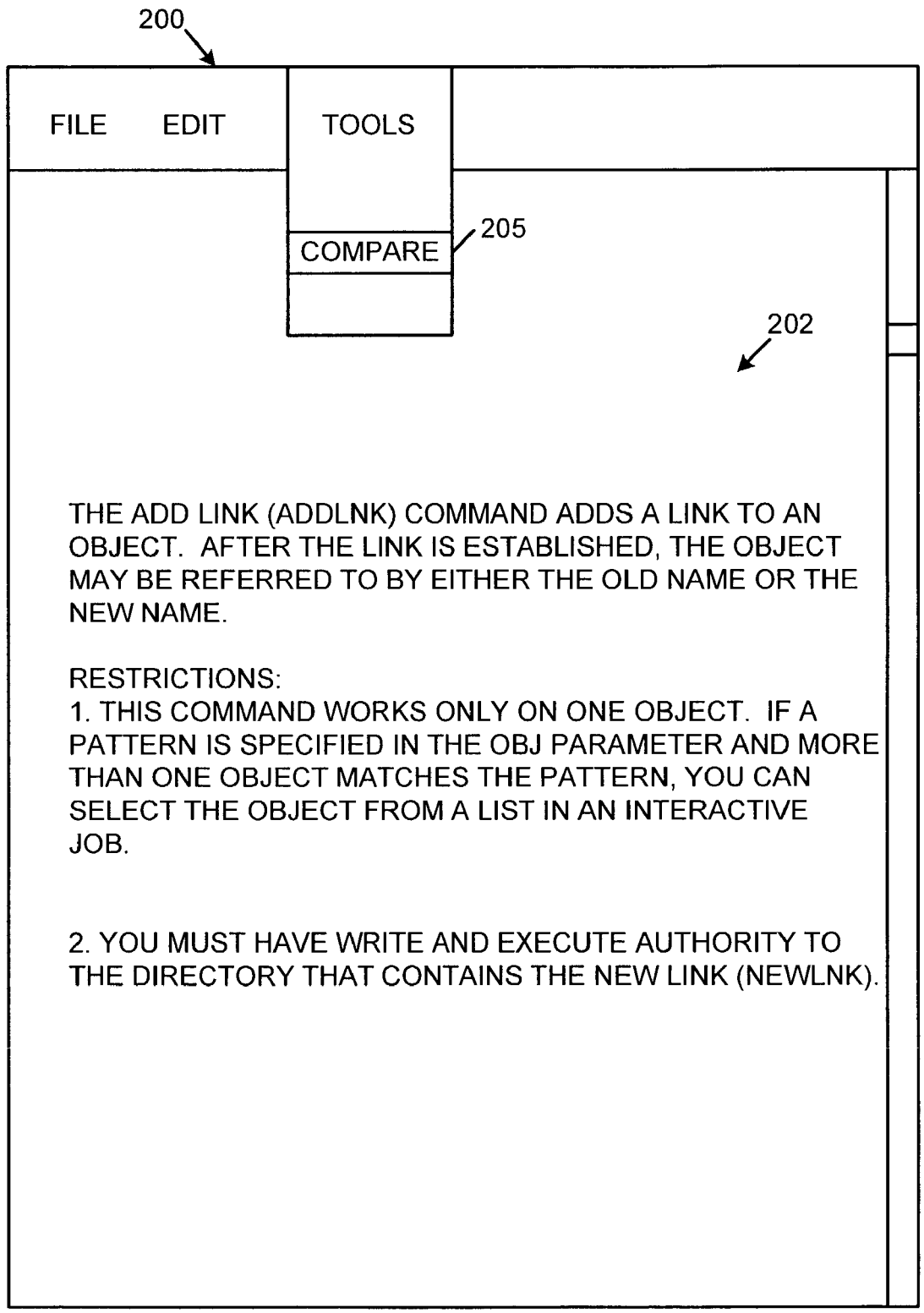
FIG. 2 depicts a pictorial representation of an example user interface, according to an embodiment of the invention.

FIG. 2 depicts a pictorial representation of an example user interface 200, according to an embodiment of the invention. Displayed within the user interface 200 are example contents 202 of the new version 128. When a compare option 205 is selected via the input device 120, the difference engine 126 is invoked to display or otherwise present a compare dialog via the output device 122, an example of which is further described below with reference to FIG. 3.

The contents of the user interface 200 and the contents 202 of the new version 128 are exemplary only, and in other embodiments any appropriate user interface and contents may be used. Although FIG. 2 illustrates the difference engine 126 as being invoked as an option by a user via the user interface 200, in other embodiments, the difference engine 126 may be invoked by another program or may be a stand-alone tool. Although FIG. 2 is drawn to show an invocation of the difference engine 126 from a display of the contents 202 of the new version 128, in another embodiment, the difference engine 126 may be invoked from a display of the contents of the old version 140.

Figure 3:
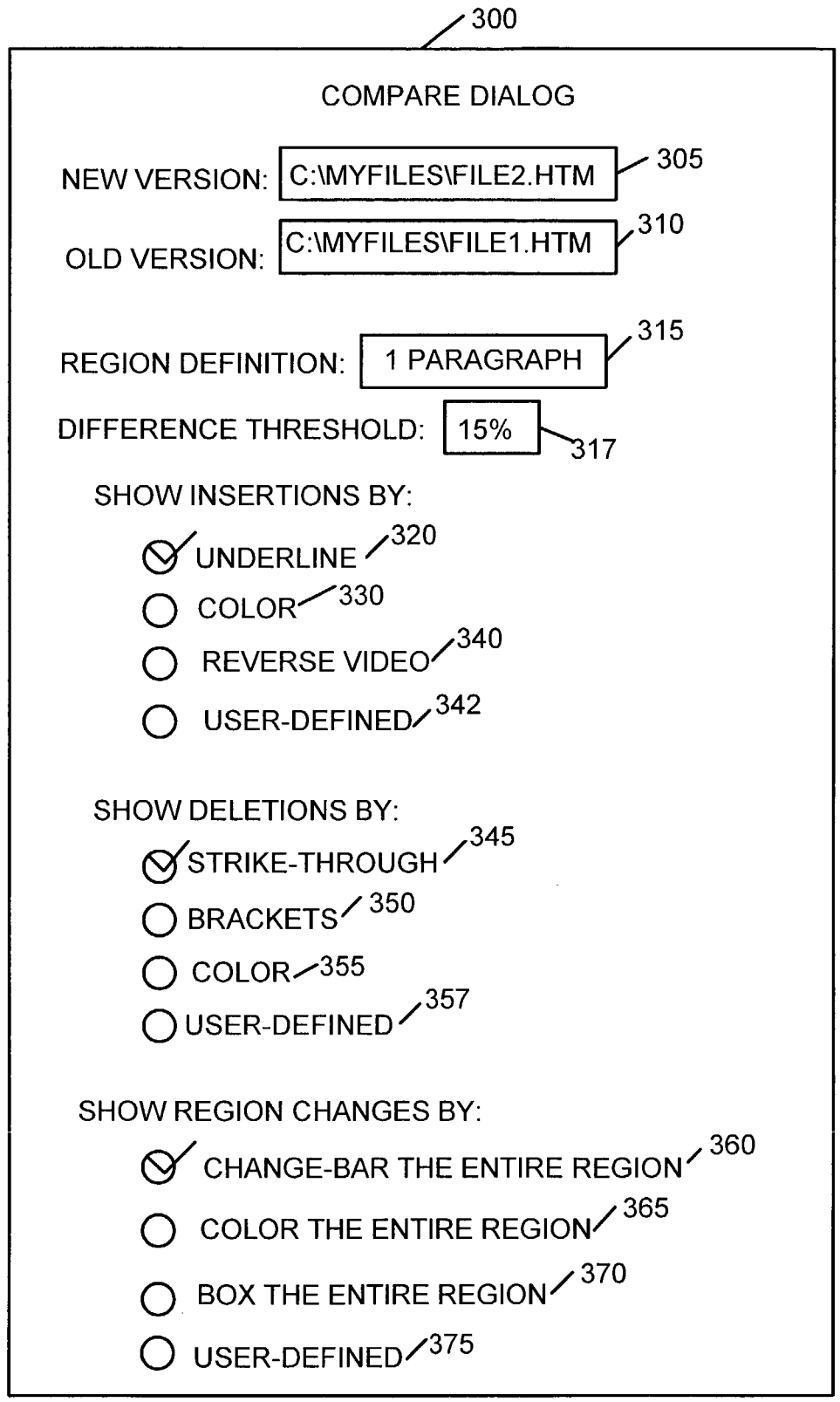
FIG. 3 depicts a pictorial representation of an example compare dialog, according to an embodiment of the invention.

FIG. 3 depicts a pictorial representation of an example compare dialog 300, which the difference engine 126 may display or otherwise present via the output device 122 in response to a selection via the input device 120 of the compare option 205, as previously described above with reference to FIG. 2, according to an embodiment of the invention. The compare dialog 300 includes a new version field 305, an old version field 310, a region definition field 315, a difference threshold field 317, a show insertions by underline option 320, a show insertions by color option 330, a show insertions by reverse video option 340, a show insertions by user-defined option 342, a show deletions by strike-through option 345, a show deletions by brackets option 350, a show deletions by color option 355, a show deletions by user-defined option 357, a show region changes by change-bar the entire region option 360, a show region changes by color the entire region option 365, a show region changes by box the entire region option 370, and a show region changes by user-defined option 375.

The new version field 305 allows the identification of the name and/or address of the new version 128. The old version field 310 allows the identification of the name and/or address of the old version 140. The contents of the new version field 305 and/or the old version field 310 may in various embodiments be entered via a user, may be passed as parameters from an invoking program, or may be initialized to a default value or values, e.g., based on the object or objects that were being displayed or otherwise presented when the difference engine 126 was invoked.

The region definition field 315 allows the specification of a region definition, which the difference engine 126 uses to divide the new version 128 into units for comparison with the old version 140, as further described below with reference to FIG. 8. Although "1 paragraph" is shown as the definition of a unit for a region in FIG. 3, in another embodiment any number of paragraphs may be specified. In still other embodiments, any number of lines, words, sentences, list elements, pages, characters, images, or audio units may be specified in the region definition field 315. In various embodiments, the new version 128 and the old version 140 may have any number of respective regions, including only one. In other embodiments, the region definition field 315 may accept any units appropriate for the type of objects to be compared. In yet another embodiment, a control code or codes (also called a tag or tags) that delineate one region from another may be entered as further described below with reference to FIG. 4.

The difference threshold field 317 allows the specification of a percentage value that controls whether the difference engine 126 will generate results that mark every change in a region or whether the difference engine 126 will mark the entire region as changed. In the example shown in FIG. 3, the difference threshold field 317 contains "15%," which indicates that if less than or equal to 15% of the words in the region of the new version 128 have been changed from the corresponding region in the old version 140, then the difference engine 126 marks every individual change in the region. But, if greater than 15% of the words in the region of the new version 128 have been changed from the corresponding region in the old version 140, then the difference engine 126 marks the entire region as changed. This level of control allows a user to easily comprehend simple changes, such as spelling corrections and word replacements, but also allows the user to easily comprehend sections that have been nearly completely rewritten.

Although the example shown uses words, other embodiments may use any appropriate elements depending on the type of objects being compared. For example, if the new version 128 and the old version 140 contain images, the images may be divided into areas, with the changed areas of the images marked for changes that do not exceed the difference threshold 317 and the entire new image shown if the difference threshold 317 is exceeded.

Although the example of FIG. 3 shows a value of 15% in the difference threshold field 317, other embodiments may use any value. In another embodiment, a slider control or any other appropriate input mechanism may be used in lieu of the input field shown. In yet another embodiment, an absolute value may be used in lieu of a percentage value. In another embodiment, the difference threshold is predetermined in the difference engine 126, and the user is not allowed to input a value.

The show insertions by underline option 320, show insertions by color option 330, show insertions by reverse video option 340, and show insertions by user-defined option 342 allow the user to select how the difference engine 126 marks individual insertions in the results of the compare operation. In another embodiment, the user is not allowed a selection; instead, the insertions are shown via predetermined markings specified by the difference engine 126. The markings for insertions indicated in FIG. 3 are exemplary only, and in other embodiments any appropriate insertion markings may be used. In another embodiment, insertion markings may be specified by the user as further described below with reference to FIG. 4.

The show deletions by strike-through option 345, show deletions by brackets option 350, show deletions by color option 355, and show deletions by user-defined option 357 allow the user to select how the difference engine 126 marks the individual deletions in the results of the compare operation. In another embodiment, the user is not allowed to make a selection, and the deletions are shown via predetermined markings. The marking options for deletions shown in FIG. 3 are exemplary only, and in other embodiments any appropriate deletion markings may be used. In an embodiment, the user need not select any of options 345, 330, 355, and 357, and the user may opt to only mark insertions.

The change-bar the entire region option 360, color the entire region option 365, box the entire region option 370, and user-defined option 375 allow the user to select how the difference engine 126 will mark the entire region as changed when the difference threshold 317 is exceeded. In other embodiments, the difference engine 126 may mark the region by chevrons at the beginning and end of the changed region, by an icon, or any other appropriate technique. In another embodiment, region changes may be specified by the user as further described below with reference to FIG. 4.

In the example shown in FIG. 3, options 320, 345, and 360 are checked, indicating that these options are selected, either as defaults or as selected by a user via the input device 120. In an embodiment, the difference engine 126 reads the selections input via the user interface 300, uses the selections to compare the new version 128 to the old version 140, and creates the results, as further described below with reference to FIGS. 5, 6, 7, 8, and 9. The specific user interface elements shown in FIG. 3 are exemplary only, and in other embodiments any appropriate user interface elements may be used.

Figure 4:
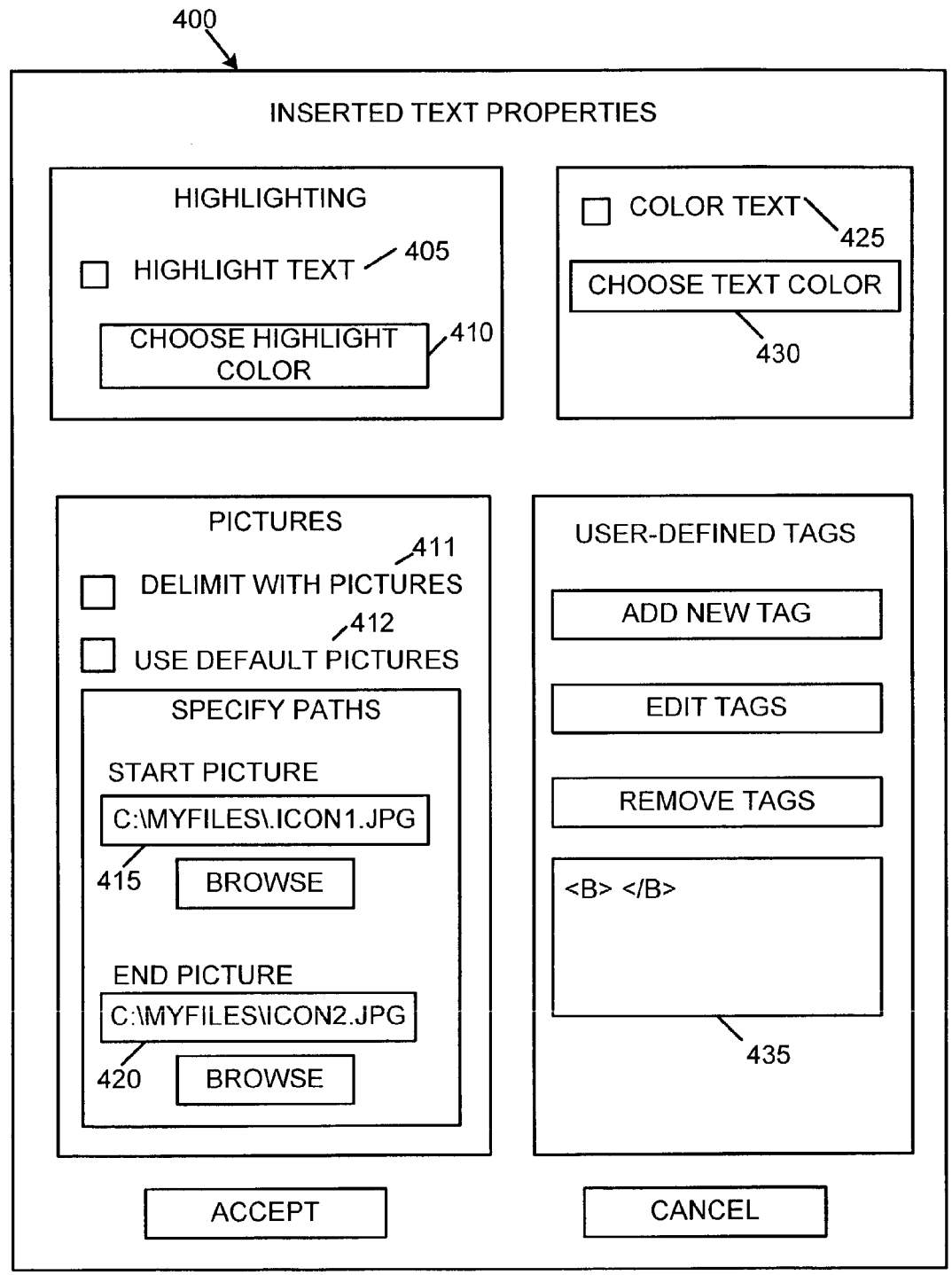
FIG. 4 depicts a pictorial representation of an example user interface for creating inserted text properties, according to an embodiment of the invention.

FIG. 4 depicts a pictorial representation of an example user interface 400 for selecting options to be used by the difference engine 126 to create inserted text properties, according to an embodiment of the invention. The user interface 400 includes a highlight text option 405, a choose highlight color button 410, a delimit with pictures option 411, a use default pictures option 412, a start picture field 415, an end picture field 420, a color text option 425, a choose text color 430, and a tag field 435.

If the user selects the highlight text option 405, the difference engine 126 marks text by highlighting the text that is new in the new version 128 when compared with the old version 140. The difference engine 126 uses the color in the highlighting that the user selects via the choose highlight color button 410.

If the user selects the delimit with pictures option 411, the difference engine 126 delimits a changed region (if the difference threshold region 317 is exceeded for the region) with the pictures or icons identified by the user in the start picture field 415 and the end picture field 420. Although the start picture field 415 and the end picture field 420 show example paths local to the electronic device 102, in other embodiments the start picture field 415 and/or the end picture field 420 may contain an identification of pictures or icons to be accessed from other electronic devices, e.g., via the network 105. Although the values in the start picture field 415 and the end picture field 420 are shown as files of type ".jpg," for JPEG files (Joint Photographic Experts Group), in other embodiments GIF (Graphics Interchange Format), PNG (Portable Network Graphics), TIF (Tagged Image File Format), BMP (Bitmap Graphics Format), DIB (Device-Independent Bitmap), or any other appropriate type of file may be used.

If the user selects the use default pictures option 412, the difference engine 126 delimits a changed region (if the difference threshold region 317 is exceeded for the region) with default pictures or icons. In an embodiment, the default icons are chevrons. In another embodiment, the default icons are pictures of scissors. But, in other embodiments, any default pictures or icons may be used.

If the user selects the color text option 425, the difference engine 126 marks changes by coloring text that is new in the new version 128 when compared with the old version 140. The difference engine 126 uses the color that the user selects via the choose color button 430.

As an alternative embodiment to the region definition field 315, the user may enter tags in the tag field 435, which the difference engine 126 uses to differentiate the regions in the versions, such as the new version 128 and the old version 140. Examples of tags are a begin-paragraph tag, an end-paragraph tag, a line-break tag, a begin-ordered-list tag, and an end-ordered-list tag, although any other appropriate tag or code may be used. Although the tag field 435 shows HTML (HyperText Markup Language) tags, in other embodiments XML (Extensible Markup Language), SGML (Standard Generalized Markup Language), or any other appropriate tag protocol may be used.

Although FIG. 4 shows an example user interface 400 for inserted text properties, in another embodiment an analogous user interface may be used for deleted text properties.

Figure 5:
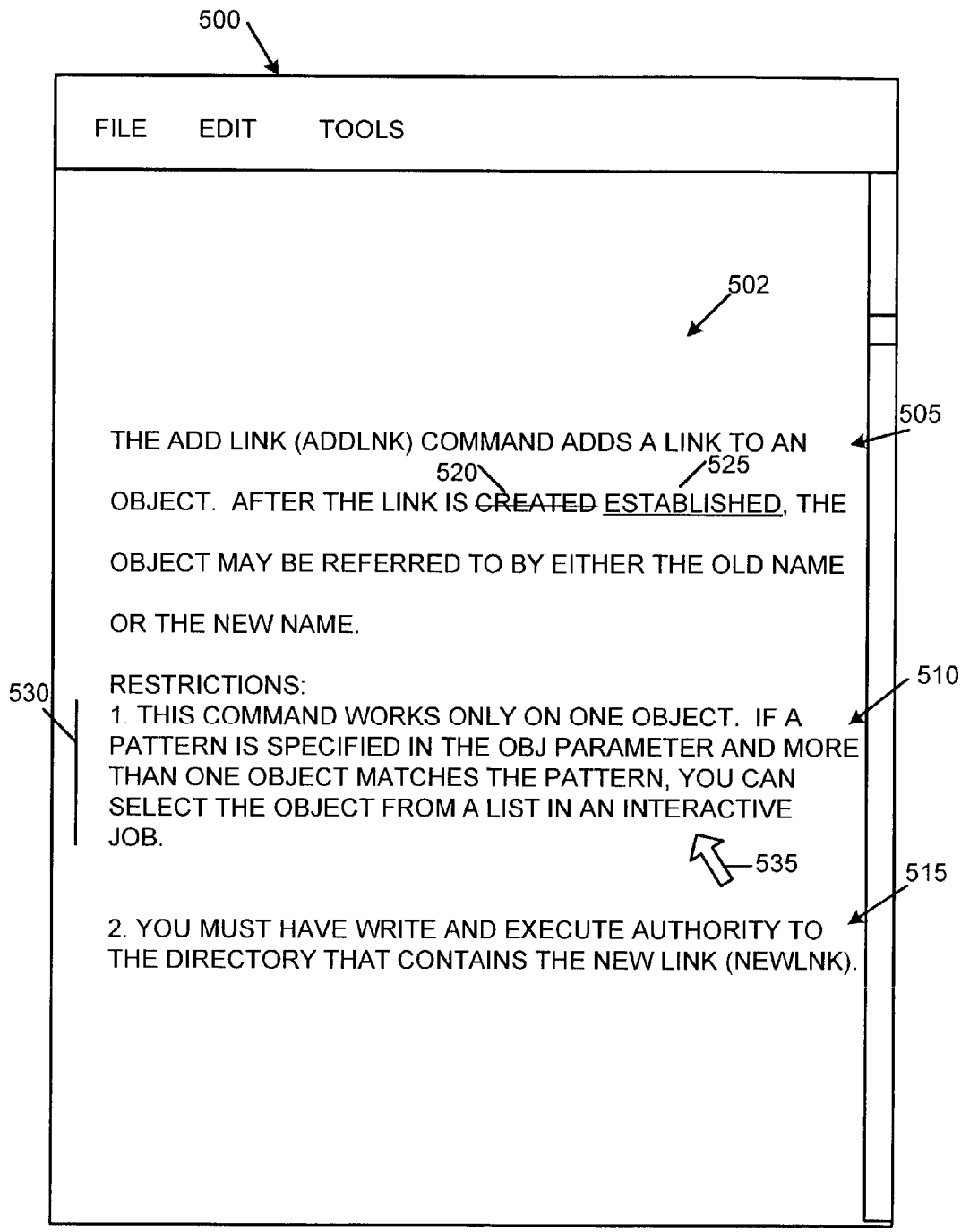
FIG. 5 depicts a pictorial representation of an example user interface for displaying the results of a compare operation with a change bar associated with an entire region, according to an embodiment of the invention.

FIG. 5 depicts a pictorial representation of an example user interface 500 for displaying the results of a compare operation by the difference engine 126 of the new version 128 compared to the old version 140, according to an embodiment of the invention. In the example shown, the difference engine 126 uses paragraphs for the regions as specified by "1 paragraph" in the region definition field 315, as previously described above with reference to FIG. 3. Thus, FIG. 5 shows the result contents 502 having three regions 505, 510, and 515 corresponding to the three paragraphs, but in other embodiments any number of regions may be present.

The difference engine 126 compared the new version 128 to the old version 140 and determined that the region 505 has two changes: the deletion of created 520 and the insertion of established 525. The difference engine 126 determined that two changes is less than the difference threshold 317 for the region 505, so the difference engine 126 individually marked the two changes with a strike-through (corresponding to the selection of the strike-through option 345 in FIG. 3) and an underline (corresponding to the selection of the underline option 320 in FIG. 3).

The difference engine 126 determined that changes to region 510 were more than the difference threshold 317 for the region 510, so the difference engine 126 did not individually mark the changes to the region 510; instead, the difference engine 126 marked the entire region 510 as being changed with a change bar 530 (corresponding to the selection of the change-bar the entire region 360 in FIG. 3).

Since the individual changes to the changed region 510 are not displayed, in an embodiment, if a pointer 535 is passing over or near the changed region 510, the difference engine 126 presents the individual changes to the changed region 510, as further described below with reference to FIGS. 6 and 9. In another embodiment, a user selects the changed region 510 via an interface on the input device 120, which causes the difference engine 126 to present individual changes to the changed region 510, as further described below with reference to FIGS. 6 and 9. In various other embodiments, the user may request that the difference engine 126 present the individual changes for a changed region when the difference threshold 317 is exceeded via a key combination on a keyboard, by popping up a menu of commands, or by any other appropriate interface technique.

The difference engine 126 determined that no changes were made to the region 515, so no changes are marked in the region 515.

Figure 6:
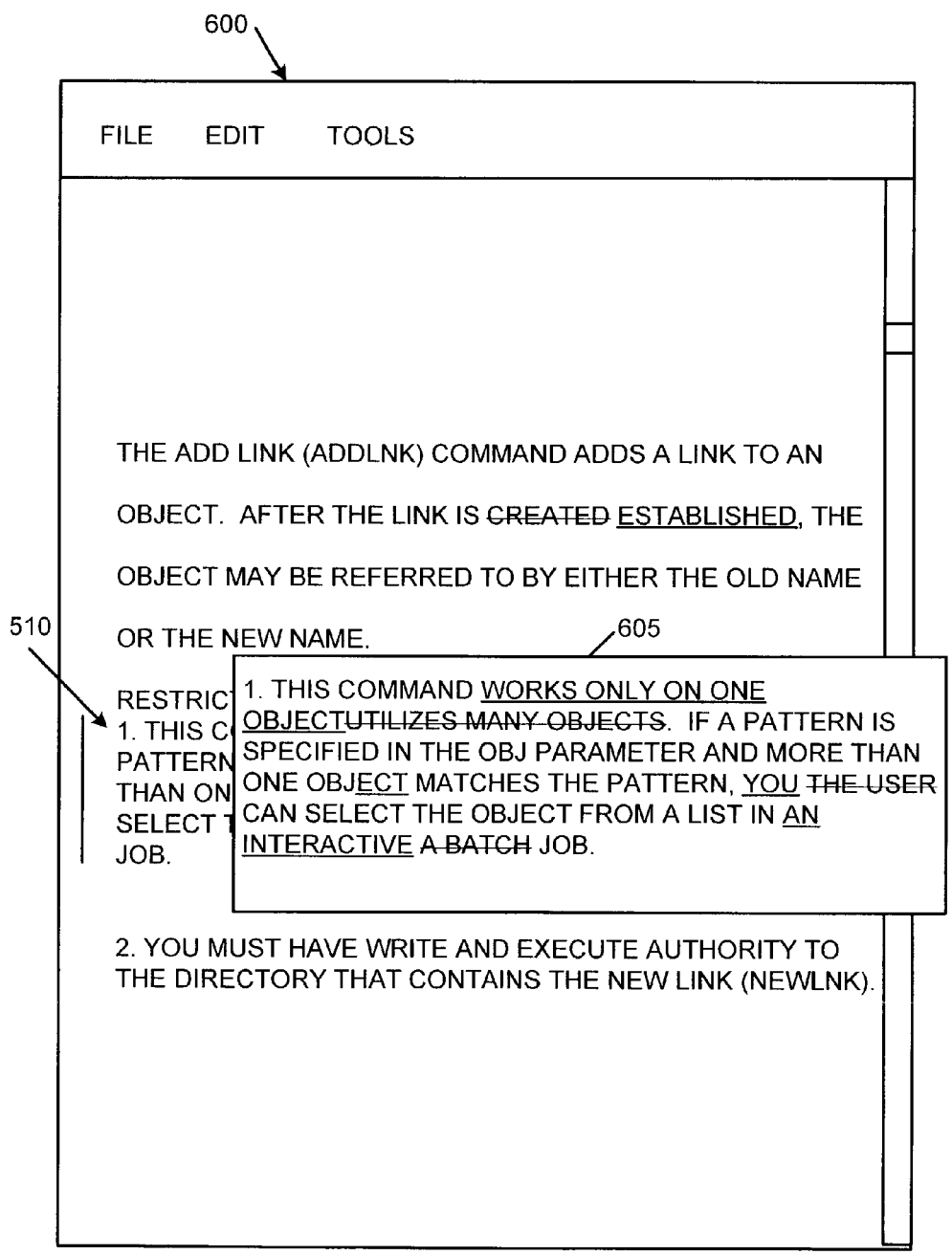
FIG. 6 depicts a pictorial representation of an example user interface for displaying individual change markings after an entire region has been marked as changed, according to an embodiment of the invention.

FIG. 6 depicts a pictorial representation of an example user interface 600 for displaying the results of a compare operation by the difference engine 126 of the new version 128 compared to the old version 140 after a selection of a changed region, according to an embodiment of the invention. As previously described above with reference to FIG. 5, when the difference engine 126 receives a command to present individual markings via a menu option, a selection, or via a pointer passed over a changed region, e.g., the region 510, the difference engine 126 presents markings for the individual changes 605 for the region. Although the individual changes 605 to the region 510 are shown in a pop-up window, in other embodiments, the individual changes may be reflected in place within the region 510.

Figure 7:
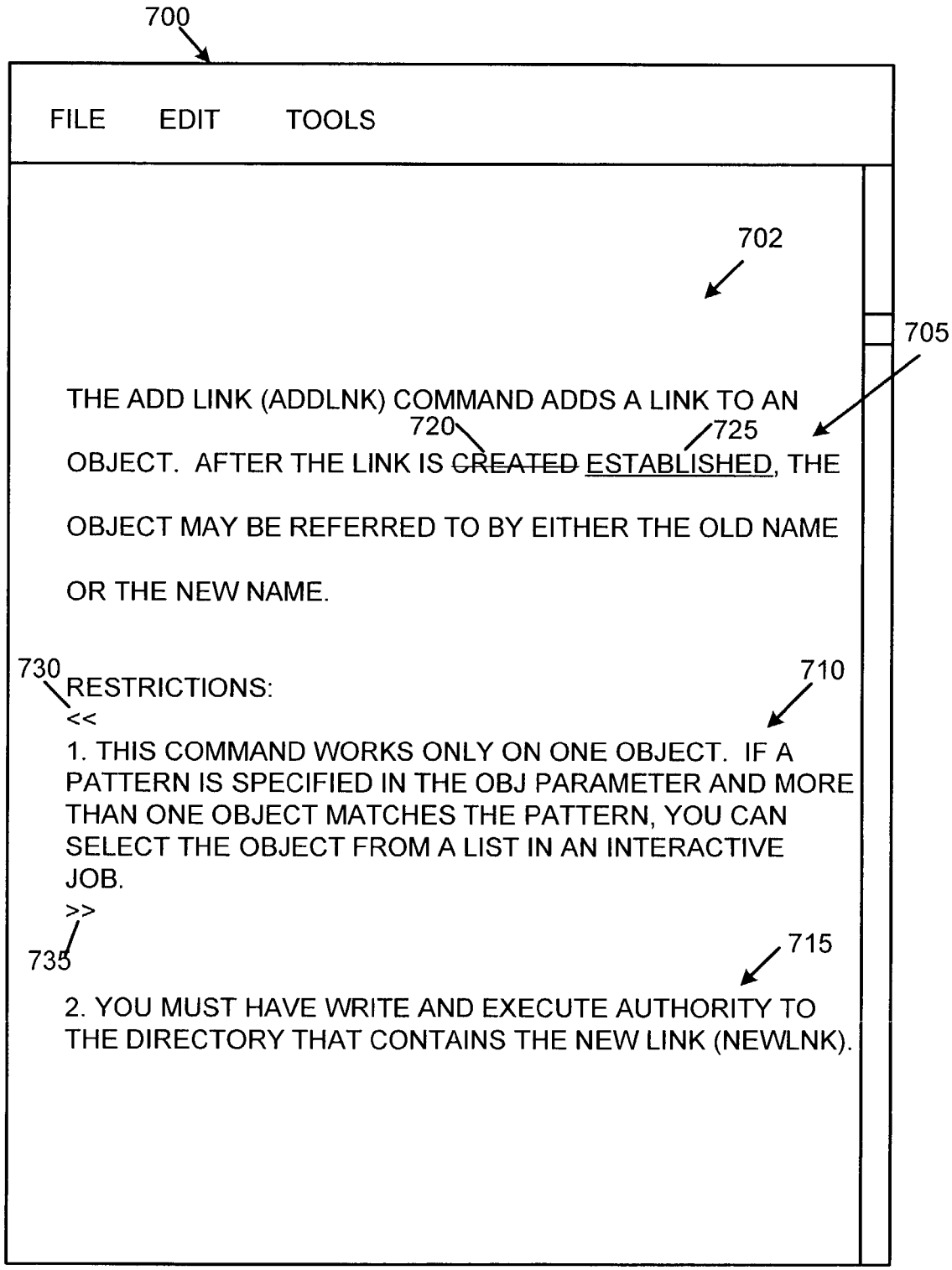
FIG. 7 depicts a pictorial representation of an example user interface for displaying the results of a compare operation with pictures delimiting a region, according to an embodiment of the invention.

FIG. 7 depicts a pictorial representation of an example user interface 700 for displaying the results of a compare operation, according to an embodiment of the invention. In the example shown, the difference engine 126 uses paragraphs for the regions as specified by "1 paragraph" in the region definition field 315, as previously described above with reference to FIG. 3. Thus, FIG. 7 shows the result contents 702 having three regions 705, 710, and 715 corresponding to the three paragraphs, but in other embodiments any number of regions may be present.

The difference engine 126 compared the new version 128 to the old version 140 and determined that region 705 has two changes: the deletion of created 705 and the insertion of established 725. The difference engine 126 determined that two changes is less than the difference threshold 317 for the region 705, so the difference engine 126 individually marked the two changes with a strike-through (corresponding to the selection of the strike-through option 345 in FIG. 3) and an underline (corresponding to the selection of the underline option 320 in FIG. 3).

The difference engine 126 determined that changes to region 710 were more than the difference threshold 317 for the region 710, so the difference engine 126 did not individually mark the changes to the region 710; instead, the difference engine 126 marked the entire region 710 as being changed with chevrons 730 and 735, which the difference engine 126 obtained from the start picture field 415 and the end picture field 420, respectively, as previously described above with reference to FIG. 4.

The difference engine 126 determined that no changes were made to the region 715, so no changes are marked in the region 715.

Figure 8:
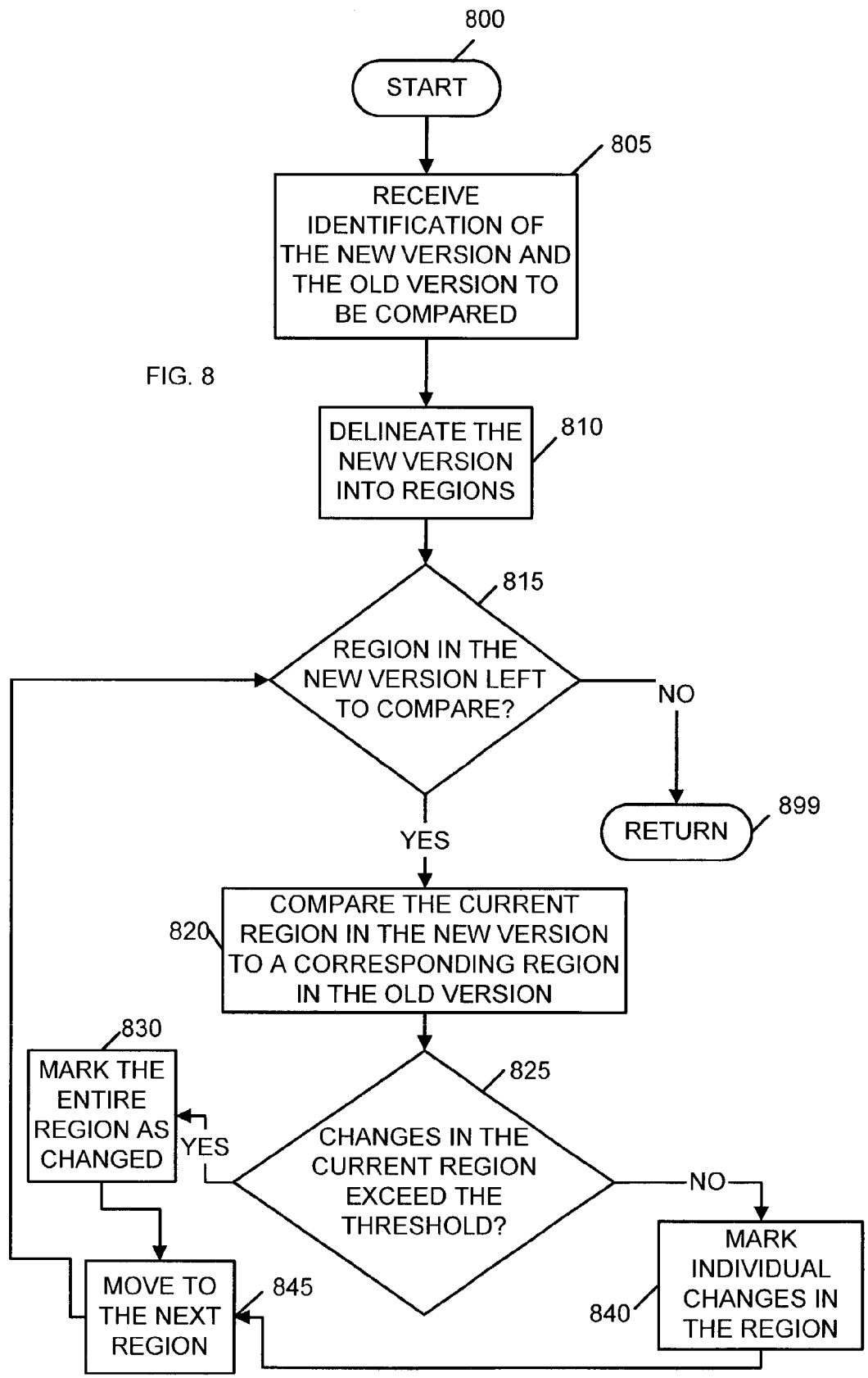
FIG. 8 depicts a flowchart of example processing for a compare operation, according to an embodiment of the invention.

FIG. 8 depicts a flowchart of example processing, according to an embodiment of the invention. Control begins at block 800. Control then continues to block 805 where the difference engine 126 receives an identification of the new version 128 and the old version 140 to be compared. This identification may be initiated, for example, via the fields 305 and 310, as previously described above with reference to FIG. 3.

Control then continues to block 810 where the difference engine 126 delineates the new version 128 into regions using the region definition 315 or the tag field 435, as previously described above with reference to FIGS. 3 and 4, and sets the current region to be the first region in the new version 128.

Control then continues to block 815 where the difference engine 126 determines whether there are any regions in the new version 128 left to compare. Block 815 is the start of a loop that will compare all regions in the new version 128 to regions in the old version 140. If the determination at block 815 is false, then the compare operation is finished, so control continues to block 899 where the function returns.

If the determination at block 815 is true, then the compare operation is not finished, and there is at least one region in the new version 128 to compare, so control continues to block 820 where the difference engine 126 compares the current region in the new version 128 to a corresponding region in the old version 140 and finds any changes between the current region in the new version 128 and the corresponding region in the old version 140.

Control then continues to block 825 where the difference engine 126 determines whether the number of changes in the current region exceeds the threshold specified in the difference threshold 317, as previously described above with reference to FIG. 3. In various embodiments the number of changes may be the number of words added and deleted, the number of sentences added and deleted, the number of images added and deleted, the number of sounds added and deleted, or any other appropriate count of changes, including only additions or only deletions.

If the determination at block 825 is true, then the difference threshold 317 is exceeded for the current region, so control continues to block 830 where the difference engine 126 marks the entire current region as changed according to the specification of options 360, 365, 370, or 375, as previously described above with reference to FIG. 3, or according to the options 411, 412, 415, and/or 420, as previously described above with reference to FIG. 4. Control then continues from block 830 to block 845 where the difference engine 126 changes the current region to be the next region in the new version 128. Control then returns to block 815 where the difference engine 126 performs the processing previously described above.

If the determination at block 825 is false, then the difference threshold 317 is not exceeded, so control continues from block 825 to block 840 where the difference engine 126 marks the individual changes in the current region according to the specification of options 320, 330, 340, 342, 345, 350, 355, and/or 357, as previously described above with reference to FIG. 3, or options 405, 410, 425, or 430, as previously described above with reference to FIG. 4.

Control then continues from block 840 to block 845 where the difference engine 126 changes the current region to be the next region in the new version 128. Control then returns to block 815, where the difference engine 126 performs the processing as previously described above.

Figure 9:
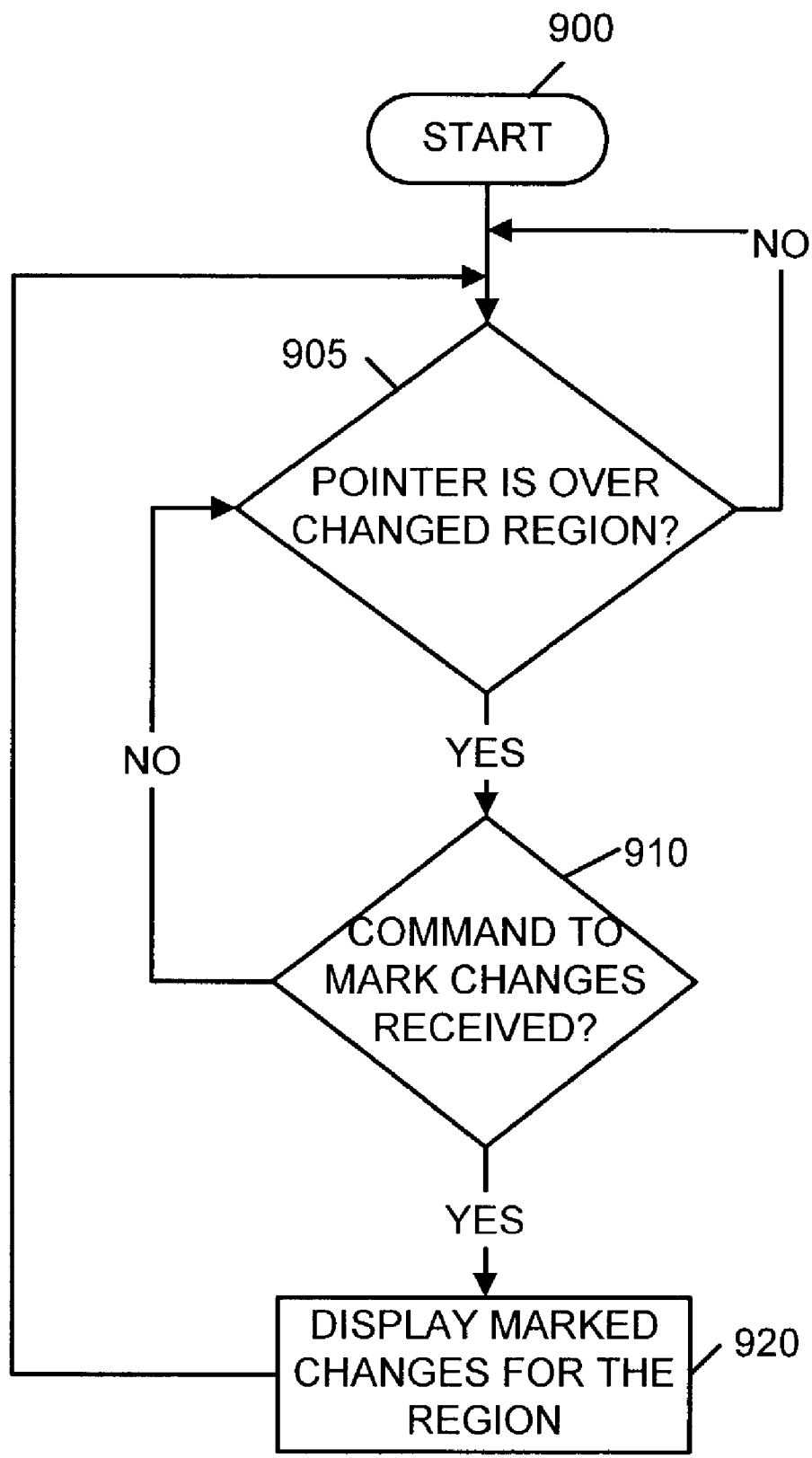
FIG. 9 depicts a flowchart of example processing for displaying individual change markings after a region has been marked as changed, according to an embodiment of the invention.

FIG. 9 depicts a flowchart of example processing for displaying individual change markings after a region has been marked as changed, according to an embodiment of the invention. Control begins at block 900. Control then continues to block 905 where the difference engine 126 determines whether a pointer, such as the pointer 535 (FIG. 5) is over a region that is marked as changed. In another embodiment, the difference engine 126 determines whether the marked region is selected or otherwise identified. If the determination at block 905 is false, then control returns to block 905, as previously described above.

If the determination at block 905 is true, then control continues to block 910 where the difference engine 126 determines whether a command to display the individual changes is received from the input device 120. If the determination at block 910 is false, then control returns to block 905 as previously described above.

If the determination at block 910 is true, then control continues to block 920 where the difference engine 126 marks the individual changes (for example the changes 605) for the changed region that was previously indicated at block 905. In an embodiment, the difference engine 126 marks the individual changes in place in the region. In another embodiment, the difference engine 126 marks the individual changes in a separate window. Control then returns to block 905 as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A computer-implemented method comprising:
   determining whether a number of changes to a region between a new version and an old version exceeds a threshold, wherein the region comprises results of a compare of the new version and the old version;
   when the number of changes does not exceed the threshold, marking the changes individually in the region; and
   when the number of changes does exceed the threshold, marking the region as changed and marking the changes individually in the region after the marking the region as changed in response to a determination that a pointer has passed over the region.

2. The method of claim 1, wherein the marking the region further comprises:
   delimiting the region with icons.

3. The method of claim 1, further comprising:
   defining the region via tags in the new version.

4. An apparatus comprising:
   means for determining whether a number of changes to a region between a new version and an old version exceeds a threshold, wherein the region comprises results of a compare of the new version and the old version;
   means for marking the changes individually in the region when the number of changes does not exceed the threshold; and
   means for marking the region as changed and marking the changes individually in the region after the marking the region as changed in response to a determination that a pointer has passed over the region when the number of changes does exceed the threshold.

5. The apparatus of claim 4, wherein the means for marking the region further comprises:
   means for delimiting the region with pictures.

6. The apparatus of claim 4, wherein the means for marking the region further comprises:
   means for highlighting the region.

7. The apparatus of claim 4, wherein the means for marking the region further comprises:
   means for coloring the region.

8. The apparatus of claim 4, wherein the means for marking the region further comprises:
   means for displaying a change bar associated with the region.

9. A storage medium encoded with instructions, wherein the instructions when executed comprise:
   defining a plurality of regions in a new version;
   comparing the new version to an old version;
   when a first number of changes to a first region of the plurality of regions exceeds a threshold, marking the first region as changed and marking the changes individually in the first region after the marking the first region as changed in response to a determination that a pointer has passed over the first region, wherein the first region comprises first results of the comparing; and
   when a second number of changes to a second region of the plurality of regions does not exceed the threshold, marking the changes to the second region individually in the second region, wherein the second region comprises second results of the comparing.

10. The storage medium of claim 9, wherein the instructions further comprise:
    marking the changes to the first region in the first region in response to a command.

11. The storage medium of claim 9, wherein the instructions further comprise:
    marking the changes to the first region in a separate window from a display of the first region in response to a command.

12. An electronic device comprising:
    a processor; and
    a storage device encoded with instructions, wherein the instructions when executed on the processor comprise:
    defining a plurality of regions in a new version,
    comparing the new version to an old version,
    when a first number of changes to a first region of the plurality of regions exceeds a threshold, marking the first region as changed and marking the changes individually in the first region after the marking the first region as changed in response to a determination that a pointer has passed over the first region, wherein the first region comprises first results of the comparing, and when a second number of changes to a second region of the plurality of regions does not exceed the threshold, marking the changes to the second region individually in the second region, wherein the second region comprises second results of the comparing.

13. The electronic device of claim 12, wherein the defining the plurality of regions further comprises:

finding a plurality of tags in the new version.

14. The electronic device of claim 12, wherein the defining the plurality of regions further comprises:

finding a plurality of tags specified by a user in the new version.

15. The electronic device of claim 12, wherein the marking the first region as changed further comprises:

delimiting the first region with icons.

16. The electronic device of claim 12, wherein the marking the first region as changed further comprises:

delimiting the first region with icons identified by a user.

* * * * *